(12) United States Patent
Shetty

(10) Patent No.: US 11,216,787 B1
(45) Date of Patent: Jan. 4, 2022

(54) MEETING CREATION BASED ON NLP ANALYSIS OF CONTEXTUAL INFORMATION ASSOCIATED WITH THE MEETING

(71) Applicant: West Corporation, Omaha, NE (US)

(72) Inventor: Santhosh Shetty, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 114 days.

(21) Appl. No.: 16/268,679

(22) Filed: Feb. 6, 2019

(51) Int. Cl.
*G06Q 10/10* (2012.01)
*G06F 40/30* (2020.01)
*G06F 40/205* (2020.01)
*G06F 40/279* (2020.01)

(52) U.S. Cl.
CPC ....... *G06Q 10/1095* (2013.01); *G06F 40/205* (2020.01); *G06F 40/279* (2020.01); *G06F 40/30* (2020.01)

(58) Field of Classification Search
None
See application file for complete search history.

(56) References Cited

U.S. PATENT DOCUMENTS

| 9,641,563 | B1* | 5/2017 | Kitada | H04N 21/43072 |
| 9,652,113 | B1* | 5/2017 | Colson | G10L 15/26 |
| 2012/0191500 | A1* | 7/2012 | Byrnes | G06Q 10/1095 |
| | | | | 705/7.19 |
| 2015/0006218 | A1* | 1/2015 | Klemm | G06Q 10/1095 |
| | | | | 705/7.19 |
| 2016/0078410 | A1* | 3/2016 | Horton | G06Q 10/1095 |
| | | | | 705/7.19 |
| 2016/0358126 | A1* | 12/2016 | Bostick | G06Q 10/1095 |
| 2017/0308866 | A1* | 10/2017 | Dotan-Cohen | H04L 43/0876 |
| 2017/0316383 | A1* | 11/2017 | Naganathan | G06Q 10/1095 |
| 2018/0046957 | A1* | 2/2018 | Yaari | G06Q 10/1095 |
| 2018/0101281 | A1* | 4/2018 | Nelson | G06N 5/022 |

(Continued)

FOREIGN PATENT DOCUMENTS

| EP | 3309730 A1 * | 4/2018 | H04L 65/403 |
| EP | 3309731 A1 * | 4/2018 | G06Q 10/1095 |

OTHER PUBLICATIONS

Liu, Fei, Feifan Liu, and Yang Liu. "A supervised framework for keyword extraction from meeting transcripts." IEEE Transactions on Audio, Speech, and Language Processing 19.3 (2010): 538-548 (Year: 2010).*

(Continued)

*Primary Examiner* — Matthew S Gart
*Assistant Examiner* — Derick J Holzmacher

(57) ABSTRACT

One example method of operation may include identifying a proposed meeting summary, processing proposed meeting summary content of the proposed meeting summary to identify topics to apply to a meeting, creating the meeting to include meeting time intervals, assigning one or more of the topics to one or more of the meeting time intervals, identifying profiles of user accounts matching one or more of the topics, assigning the user accounts, with profiles matching one or more of the topics, to one or more of the meeting time intervals with assigned ones of the topics which match the profiles of the user accounts, transmitting meeting invites to the user accounts, and initiating the meeting at a scheduled time.

17 Claims, 10 Drawing Sheets

(56) References Cited

U.S. PATENT DOCUMENTS

| | | | | |
|---|---|---|---|---|
| 2018/0101760 A1* | 4/2018 | Nelson | ............... | G06Q 10/10 |
| 2018/0101761 A1* | 4/2018 | Nelson | ............... | G06Q 10/10 |
| 2018/0101823 A1* | 4/2018 | Nelson | ............... | G06Q 10/10 |
| 2018/0101824 A1* | 4/2018 | Nelson | ............... | H04L 12/1831 |
| 2018/0114177 A1* | 4/2018 | Somech | ............... | H04L 67/22 |
| 2019/0073640 A1* | 3/2019 | Udezue | ............... | H04L 12/1818 |
| 2020/0005248 A1* | 1/2020 | Gerzi | ............... | G06Q 10/1095 |

OTHER PUBLICATIONS

Nesi, Paolo, Gianni Pantaleo, and Gianmarco Sanesi. "A Distributed Framework for NLP-Based Keyword and Keyphrase Extraction From Web Pages and Documents." DMS. 2015 (Year: 2015).*

Shukla, Himani, and Misha Kakkar. "Keyword extraction from educational video transcripts using NLP techniques." 2016 6th International Conference-Cloud System and Big Data Engineering (Confluence). IEEE, 2016 (Year: 2016).*

Cao, Jinwei, et al. "Automated question answering from lecture videos: NLP vs. pattern matching." Proceedings of the 38th Annual Hawaii International Conference on System Sciences. IEEE, 2005 (Year: 2005).*

Zhang, Dongsong, and Jay F. Nunamaker. "A natural language approach to content-based video indexing and retrieval for interactive e-learning." IEEE Transactions on multimedia 6.3 (2004): 450-458 (Year: 2004).*

* cited by examiner

US 11,216,787 B1

MEETING CREATION BASED ON NLP ANALYSIS OF CONTEXTUAL INFORMATION ASSOCIATED WITH THE MEETING

TECHNICAL FIELD OF THE APPLICATION

This application relates to the automated creation of meetings, and more specifically to a dynamic approach to identifying contextual information and creating and inviting relevant parties to attend a scheduled meeting via computer resources.

BACKGROUND OF THE APPLICATION

Conventionally, meetings among peers in the workplace or other parties with common interests are performed in a relatively blinded process. For example, an invitee may receive a letter in the mail, an e-mail, identify a bulletin posting, etc., that indicates a meeting will occur at a certain date and time, and the meeting has certain information that is overly broad and which does not suggest much relevance with regard to what will actually be shared during the meeting time. A user may schedule the meeting in his or her personal calendar, such as a smartphone device application. At the maturity date, a reminder may be sent via a message format that is common to a smartphone, such as a banner reminder, a SMS message, an email message, etc. The reminder can be viewed by the user, and a link may be presented to join a conference bridge that operates over a phone, Internet portal, etc. Once inside the meeting, the user can hear others, speak to others and perhaps even view interactive content shared by one or more participants.

In this conventional meeting approach, the meeting is still setup, run, and/or executed by a particular person similar to the way a professor teaches a class or a host shares information in a business meeting. However, those meeting efforts leave the invitees wondering the entire time as to what is important, what is relevant to their personal knowledgebase, what is coming next during the course of the meeting. With the increase in computing device use and other time saving technologies, the amount of time a participant can share with a meeting is continuously being reduced to account for more important events. This reality places increased pressure on meetings to be more efficient, to be conducted in less time, and to share meeting strategy information upfront with the invitees, etc.

SUMMARY OF THE APPLICATION

Example embodiments of the present application provide at least a method that includes at least one of identifying a proposed meeting summary, processing proposed meeting summary content of the proposed meeting summary to identify a plurality of topics to apply to a meeting, identifying profiles matching one or more of the plurality of topics, transmitting meeting invites to user accounts linked to the profiles, receiving one or more confirmations from the user accounts confirming attendance at the meeting, initiating the meeting at a scheduled time, and forwarding an initial topic summary to each user account during a beginning of the meeting.

Another example embodiment may include an apparatus that includes a processor configured to identify a proposed meeting summary, process proposed meeting summary content of the proposed meeting summary to identify a plurality of topics to apply to a meeting, and identify profiles matching one or more of the plurality of topics, and a transmitter configured to transmit meeting invites to user accounts linked to the profiles, a receiver configured to receive one or more confirmations from the user accounts confirming attendance at the meeting, and the processor is further configured to initiate the meeting at a scheduled time; and forward an initial topic summary to each user account during a beginning of the meeting.

Yet another example embodiment may include a non-transitory computer readable storage medium configured to store instructions that when executed cause a processor to perform identifying a proposed meeting summary, processing proposed meeting summary content of the proposed meeting summary to identify a plurality of topics to apply to a meeting, identifying profiles matching one or more of the plurality of topics, transmitting meeting invites to user accounts linked to the profiles, receiving one or more confirmations from the user accounts confirming attendance at the meeting, initiating the meeting at a scheduled time, and forwarding an initial topic summary to each user account during a beginning of the meeting.

Still another example embodiment may include a method that includes identifying a plurality of topics to apply to a meeting having a defined time window, creating a plurality of meeting time intervals corresponding to the plurality of topics, transmitting meeting invites to user accounts identified as potential meeting attendees, identifying when the user accounts were active in the meeting, and determining the user accounts fulfilled a topic fulfillment obligation of one or more of the plurality of topics based on a user account presence during one or more of the plurality of meeting intervals.

Still yet another example embodiment may include an apparatus that includes a processor configured to identify a plurality of topics to apply to a meeting having a defined time window, and create a plurality of meeting time intervals corresponding to the plurality of topics, and a transmitter configured to transmit meeting invites to user accounts identified as potential meeting attendees, wherein the processor is further configured to identify when the user accounts were active in the meeting, and determine the user accounts fulfilled a topic fulfillment obligation of one or more of the plurality of topics based on a user account presence during one or more of the plurality of meeting intervals.

Still yet another example embodiment may include a non-transitory computer readable storage medium configured to store instructions that when executed cause a processor to perform identifying a plurality of topics to apply to a meeting having a defined time window, creating a plurality of meeting time intervals corresponding to the plurality of topics, transmitting meeting invites to user accounts identified as potential meeting attendees, identifying when the user accounts were active in the meeting, and determining the user accounts fulfilled a topic fulfillment obligation of one or more of the plurality of topics based on a user account presence during one or more of the plurality of meeting intervals.

Still yet a further example embodiment may include a method that includes identifying a proposed meeting summary, processing proposed meeting summary content of the proposed meeting summary to identify a plurality of topics to apply to a meeting, creating the meeting to include a plurality of meeting time intervals, assigning one or more of the plurality of topics to one or more of the plurality of meeting time intervals, identifying profiles of user accounts matching one or more of the plurality of topics, assigning the user accounts, with profiles matching one or more of the plurality of topics, to one or more of the meeting time intervals with assigned ones of the plurality of topics which match the profiles of the user accounts, transmitting meeting invites to the user accounts, and initiating the meeting at a scheduled time.

Still yet a further example embodiment may include an apparatus that includes a processor configured to identify a proposed meeting summary, process proposed meeting summary content of the proposed meeting summary to identify a plurality of topics to apply to a meeting, create the meeting to include a plurality of meeting time intervals, assign one or more of the plurality of topics to one or more of the plurality of meeting time intervals, identify profiles of user accounts matching one or more of the plurality of topics, assign the user accounts, with profiles that match one or more of the plurality of topics, to one or more of the meeting time intervals with assigned ones of the plurality of topics which match the profiles of the user accounts, and a transmitter configured to transmit meeting invites to the user accounts that indicate the meeting at a scheduled time.

Another example embodiment may include a non-transitory computer readable storage medium configured to store instructions that when executed cause a processor to perform identifying a proposed meeting summary, processing proposed meeting summary content of the proposed meeting summary to identify a plurality of topics to apply to a meeting, creating the meeting to include a plurality of meeting time intervals, assigning one or more of the plurality of topics to one or more of the plurality of meeting time intervals, identifying profiles of user accounts matching one or more of the plurality of topics, assigning the user accounts, with profiles matching one or more of the plurality of topics, to one or more of the meeting time intervals with assigned ones of the plurality of topics which match the profiles of the user accounts, transmitting meeting invites to the user accounts, and initiating the meeting at a scheduled time.

DETAILED DESCRIPTION OF THE APPLICATION

Figure 1A:
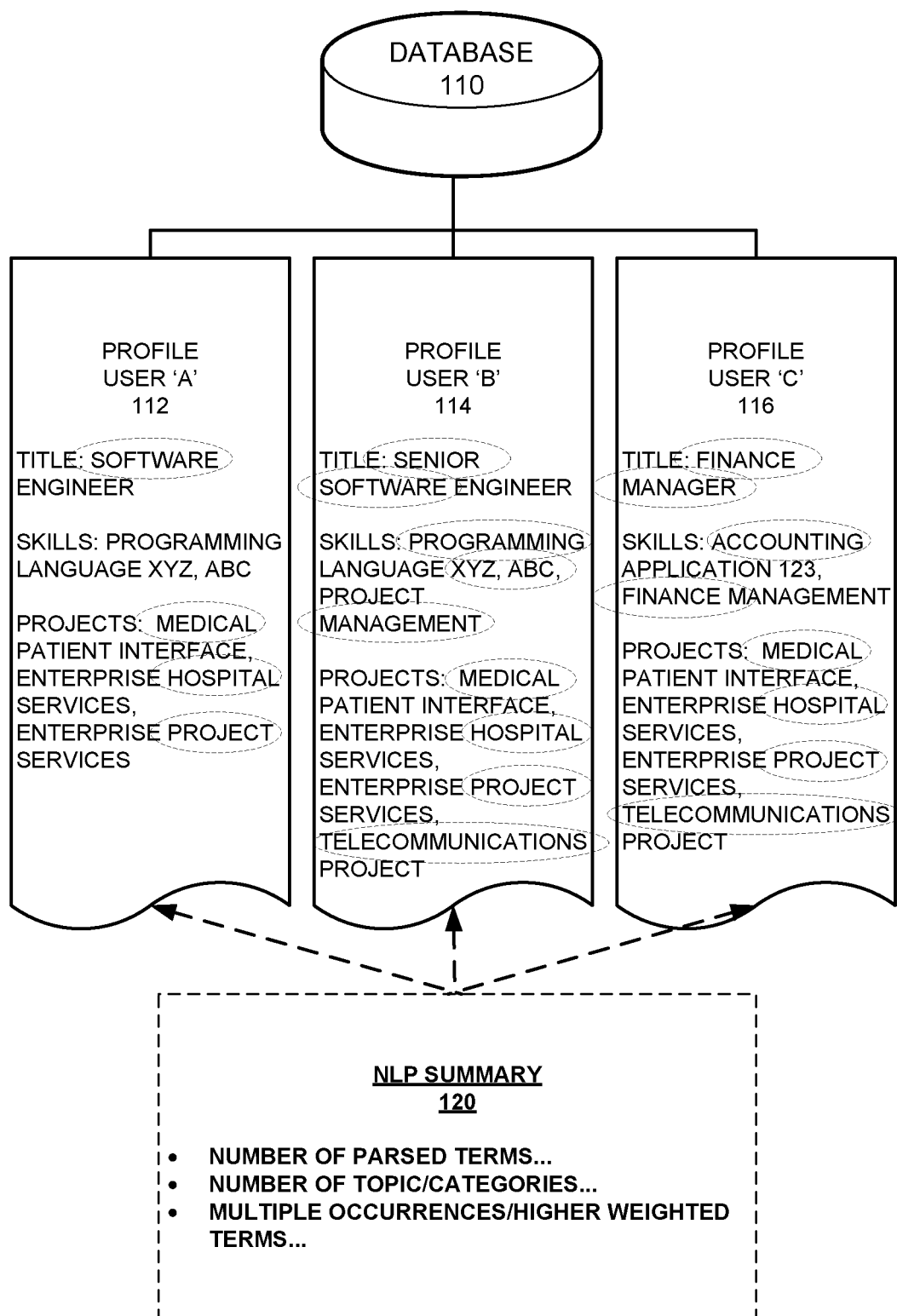
FIG. 1A illustrates an example profile identification and information extraction procedure according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to automatically generate meetings, such as scheduled events, conferences, in-person meetings, online meetings, telephonic meetings, etc. The meetings are generated based on an analysis of content which may include one or more of spoken comments which were recorded, e-mail messages which were created and analyzed by a computing device, short message service (SMS) messages which were created and analyzed by a computing device, telephonic discussions which were recorded, converted to textual information and which were then analyzed by a computing device, such as a data management server (not shown) coupled to a database (i.e., database 110 in FIG. 1A).

Once a content source is identified, the content may be analyzed to identify the purpose(s) of the meeting based on identified topics of interest to highlight in a meeting proposal/invite/summary. The topics can be words or phrases which are known and matched to the analyzed content used to drive the meeting creation. For example, an e-mail may have various terms and phrases, however, during a natural language processing analysis, certain terms and phrases may be weighted higher due to their frequent occurrence when compared to other words and phrases and/or due to their identified relevance based on known words and phrases which are comparatively identified as being more important than other words and phrases, and thus should be the key data points for creating a meeting, determining which profiles to include in the meeting and to organize the meeting, one or two topics at a time.

FIG. 1A illustrates an example profile identification and information extraction procedure according to example embodiments. Referring to FIG. 1A, the configuration 100 may include a data content server which includes a database 110 as a source of information that is used to receive, store and process content which could be used to initiate a meeting and invite others to attend. In this example, various potential participants in a future meeting may be identified from their profiles, such as a user profile associated with an enterprise record of an employee or other affiliate of the organization. Such profiles may include job title, work functions/skills, such as those identified on a resume, active projects, previous projects, etc. The more senior level employees or affiliates may have larger skillsets and thus more or fewer reasons to attend a particular meeting or a meeting interval/segment. For example, a senior employee may need to be present at a budget discussion (high-level business) but not at a product troubleshooting discussion or team meeting of a few employees (low-level discussion). This is why a set of meeting intervals which are defined by a context which is distributed to all participants which are relevant to that context may optimize time and resources in the enterprise.

The example in FIG. 1A includes three user profiles 112-116 representing users A-C. The content of those profiles varies among the different users. For example, the content of user 'A' may include a software engineer with certain skills and certain projects assigned accordingly. The user 'B' may also be a software engineer but may also include a senior status and additional skills and projects, or, possibly fewer depending on the other users not shown. The last example is for a finance manager with other skills that are not the same as the first two users, however, the projects overlap with the other users. This information may be processed for all users in an organization and stored in a database 110. At some point, the natural language processing (NLP) 120 may be conducted and the results may be tabulated in a results file to include all relevant parsed words, all topics categories identified, higher weighted words by frequency/known relevance, etc. The topics can then be created and used to form the basis of the meeting purpose, meeting intervals and the meeting invitees.

Figure 1B:
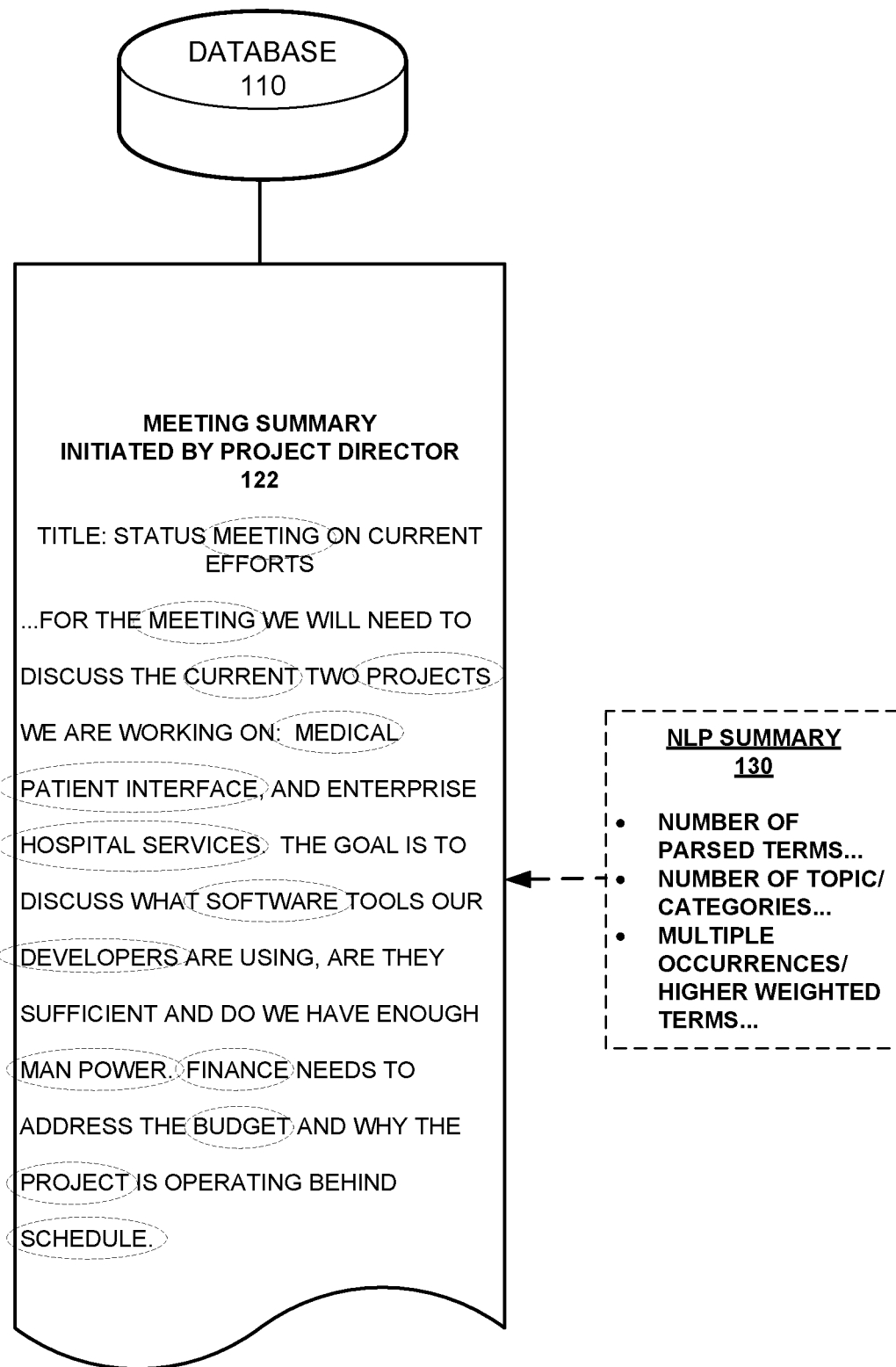
FIG. 1B illustrates an example proposed meeting summary information extraction procedure according to example embodiments

FIG. 1B illustrates an example proposed meeting summary information extraction procedure according to example embodiments. Referring to FIG. 1B, the example 150 provides a meeting summary initiated by a particular user (i.e., project director) 122. The user may write openly and freely and the NLP engine operating in the database 110 may process the content to identify whether a meeting is necessary. For example, terms, such as "discussion", "meeting", "project", "budget", "deadline", etc., may be stored in a common word file that is stored in the database and used to determine whether any term or related term should be weighted greater than other terms based on a designated importance factor. Also, frequent occurrences of a word or phrase, which is meeting-related, as defined in the common word file, may invoke the meeting creation process as well. The potential meeting content in this case, as identified from the summary, includes words which identify the need for a meeting based on certain terms, for example: projects, patient interfaces, developers, finance, etc. The NLP summary 130 may be compared to the NLP summary 120 of the user profiles to identify the meeting topics, the meeting invitees, etc.

Figure 2:
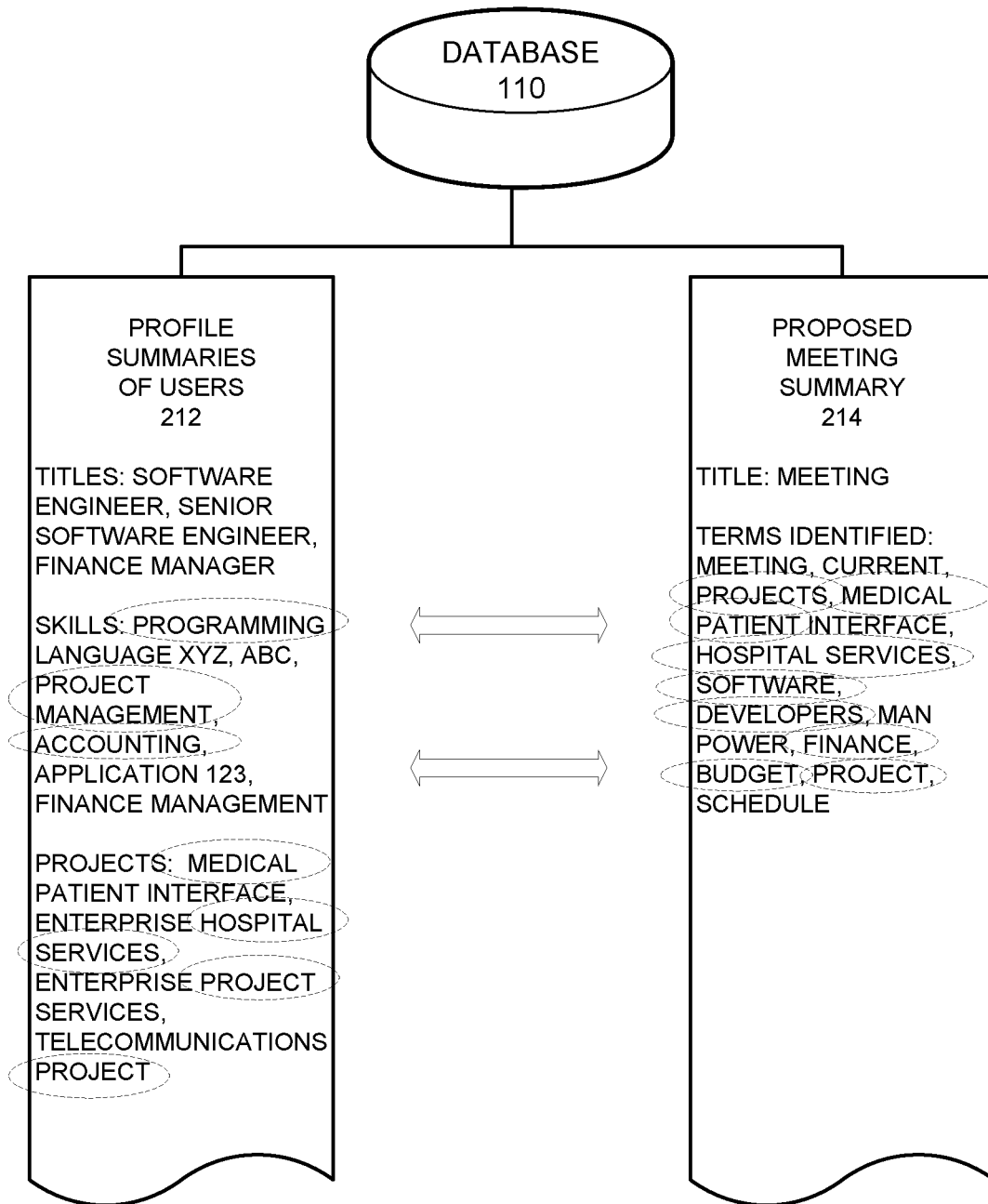
FIG. 2 illustrates an example profile summary and proposed meeting summary information comparing configuration according to example embodiments.

FIG. 2 illustrates an example profile summary and proposed meeting summary information comparing configuration according to example embodiments. Referring to FIG. 2, the configuration 200 demonstrates how the content in the database 110 may include profile summaries of users 212 and propose meeting summary information 214. The cross-correlation between the profiles 212 and the summaries 214 may include comparing terms, aliases of terms and identifying matches. The matches are used to score relevancy of user profiles which should be invited to a particular meeting and what segments the users should attend. For example, if the summary mentions software development for the medical and hospital services projects and there are 10 user profiles working on those projects and 3 of which are computer developers/programmers, by title, then those individuals would be stronger candidates for attending the meeting, at least the software development and/or project segments, and should be invited if a meeting is scheduled.

Figure 3A:
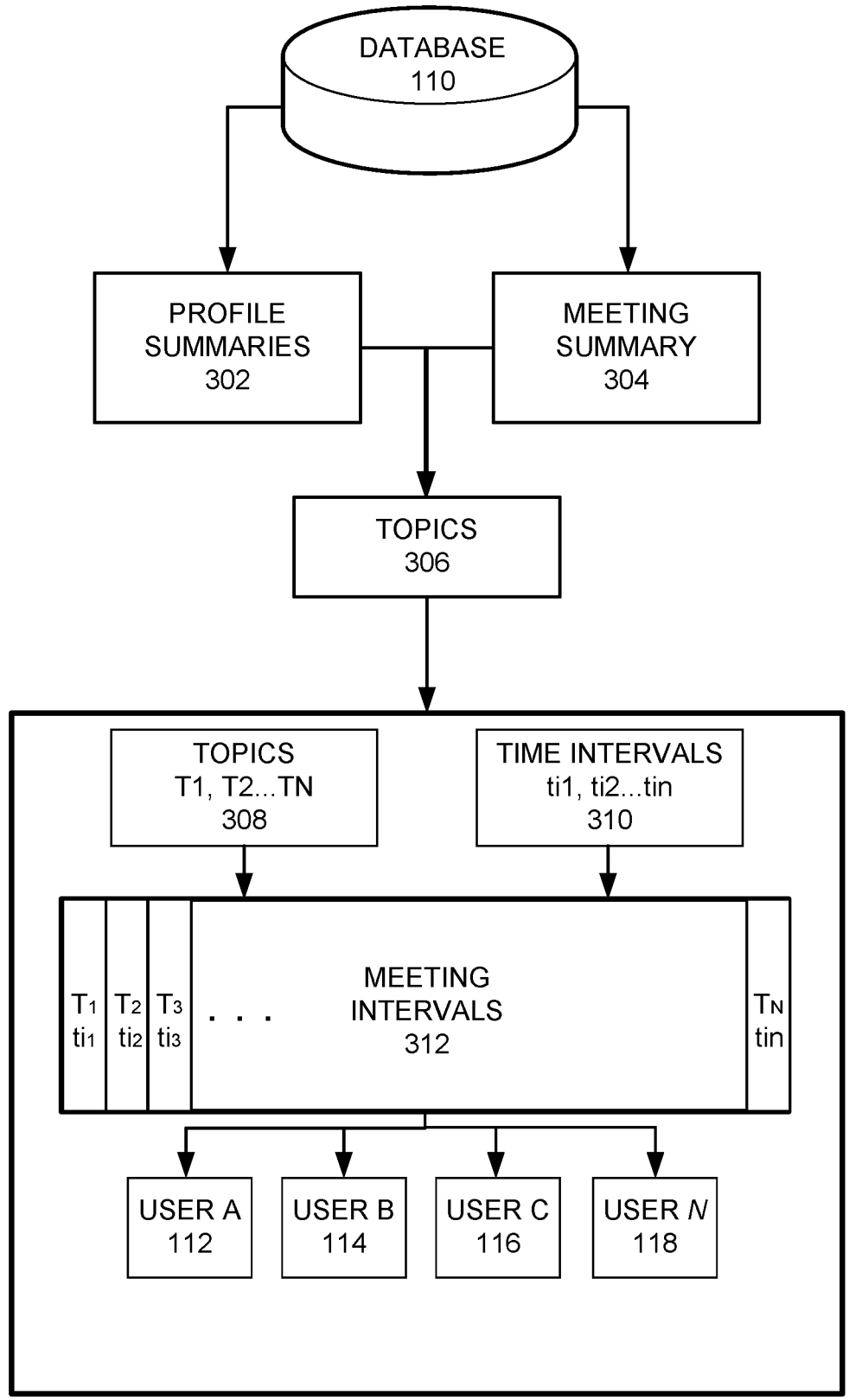
FIG. 3A illustrates an example meeting creation and meeting time interval assignment procedure according to example embodiments.

FIG. 3A illustrates an example meeting creation and meeting time interval assignment procedure according to example embodiments. Referring to FIG. 3A, the configuration 300 provides the profile summaries 302 and the meeting summary information 304 being used to compare the content for similarities so meeting topics 306 can be automatically generated and used to populate time intervals 310 or segments defined by topic(s) 308 and time slots of the total meeting (e.g., 10 minutes of 60 total meeting minutes). The total meeting interval 312 may then be defined as a meeting with one or more topics (TN) assigned to one or more time intervals (tin). The users 112-118 may then be assigned to one ore more segments so they know what time to attend, the invites can be sent before their specifically assigned intervals and the meeting can be spread out in segments with varying participant assignments across the entire total meeting interval 312.

Figure 3B:
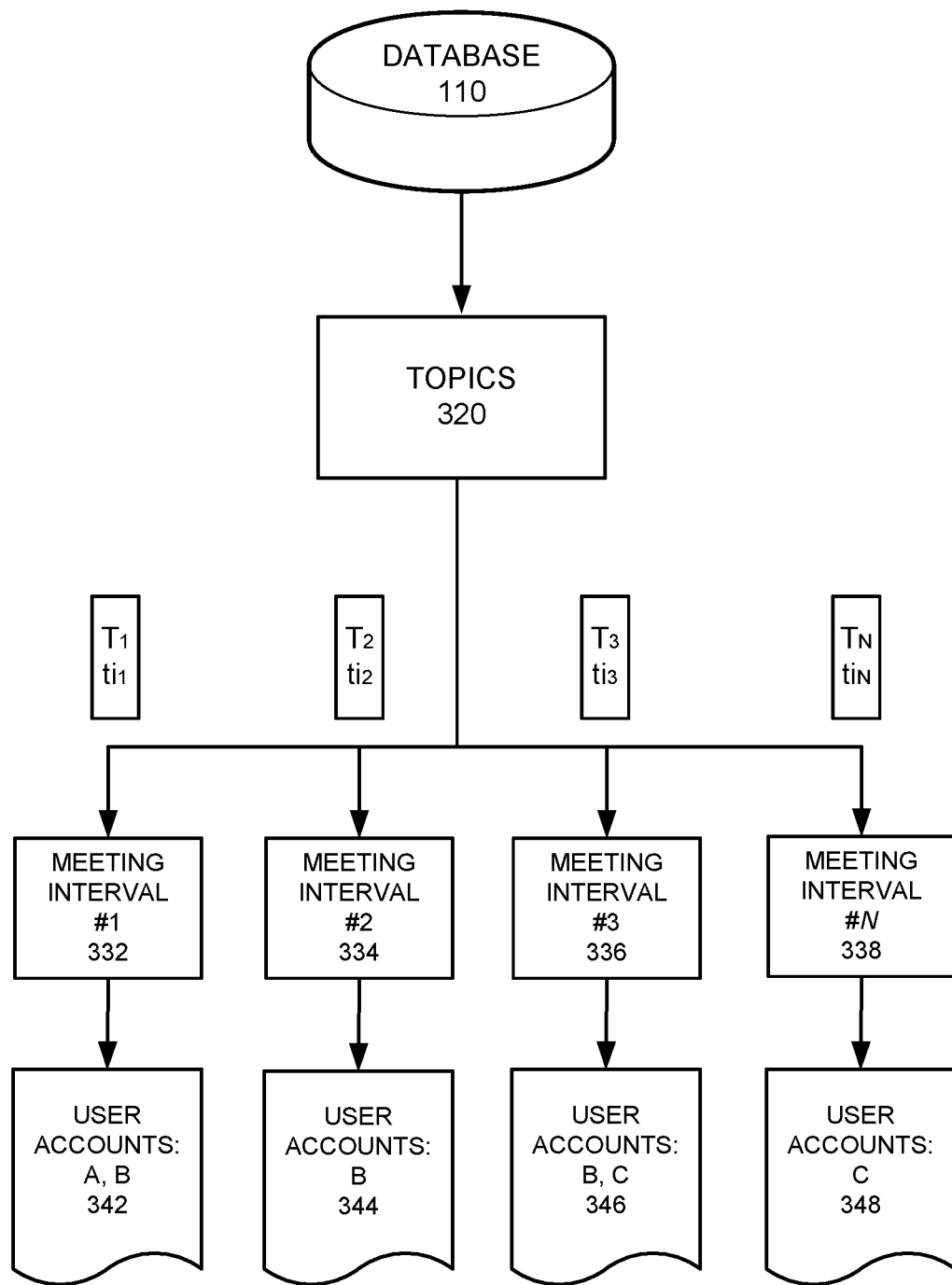
FIG. 3B illustrates an example meeting topic and time interval assignment to various user devices procedure according to example embodiments.

FIG. 3B illustrates an example meeting topic and time interval assignment to various user devices procedure 350 according to example embodiments. Referring to FIG. 3B, the entire allocation of time interval segments 320 may include meeting intervals 332-338 assigned to various user accounts 342-348. For example, the first part of the meeting may be designated for users A and B, while other segments may be designated for other combinations of user accounts depending on their profiles and confirmations received when invited. Senior employees may be assigned important management segments and low-level team related tasks may be assigned to senior members which are part of those tasks and/or the non-senior employees which are working on those project tasks.

Figure 4A:
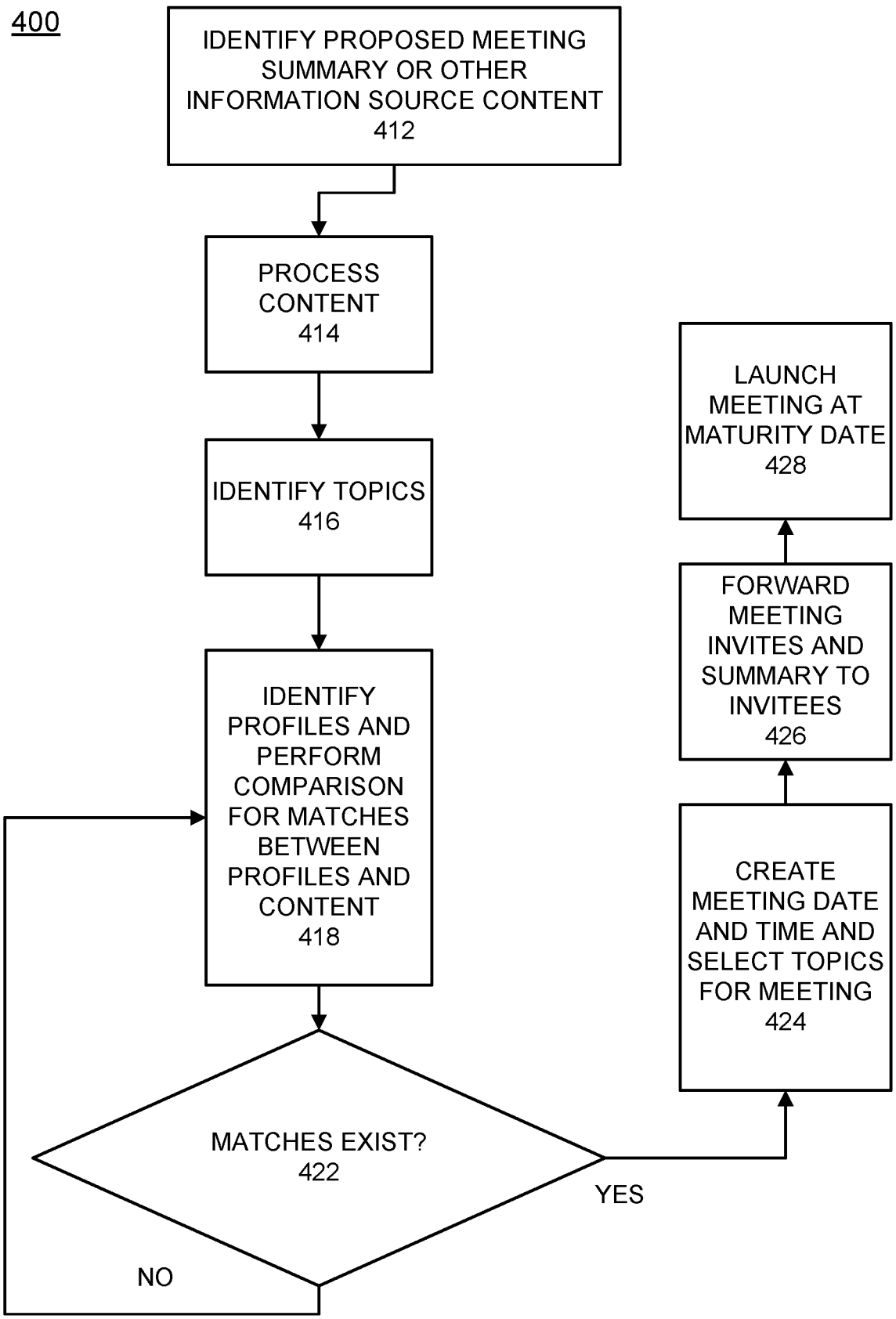
FIG. 4A illustrates an example flow diagram of an automated meeting creation configuration according to example embodiments.

FIG. 4A illustrates an example flow diagram of an automated meeting creation configuration according to example embodiments. Referring to FIG. 4A, in this example, the automated meeting creation may be based on topics and corresponding user profiles which correlate to the identified topics, which are derived from the meeting context source, such as an e-mail or other textual content source (e.g., phone call, video, audio, report, etc.).

In one example, a sample method 400 may include identifying a proposed meeting summary 412 (e.g., phone call, video, audio, report, e-mail, SMS messaged, etc.), processing proposed meeting summary content 414 of the proposed meeting summary to identify a plurality of topics 416 (e.g., software, project names, finance, deadlines, product bugs, progress) to apply to a meeting. The method may then include identifying profiles matching one or more of the plurality of topics 418, transmitting meeting invites to user accounts linked to the profiles which were selected to participate based on the content matching, assuming the matches can be made between the profiles' content and the proposed meeting summary content 422, the meeting is created and a time and place may be set along with topics of discussion 424. The method may also include sending 426 and receiving one or more confirmations from the user accounts confirming attendance at the meeting, and then initiating the meeting at a scheduled time 428. Also, an initial topic summary can be created to correlate with each meeting segment (e.g., software, project XYZ, budget, finance, etc.) and then sent to each user account during a beginning of the meeting.

The profiles are identified as matching one or more of the plurality of topics when profile content of the profiles includes one or more identifiable skills which are related to the one or more of the plurality of topics. The one or more identifiable skills are determined to be related to the one or more of the plurality of topics when the one or more identifiable skills are identified as being within one or more categories associated with the plurality of topics. The proposed meeting summary content may include one or more of a plurality of textual words, a video file, and an image file. The method may also include parsing words and phrases from the proposed meeting summary content, responsive to the parsing of the words and phrases, determining a number of occurrences of related words and phrases, and creating the plurality of topics based on the number of occurrences of related words and phrases. The profiles are selected from a group having one or more of an enterprise directory and a social network group, such as an online tool, such as LINKEDIN where professional profiles are well-established and are identified in detail. The method may also include assigning a plurality of time slots to the meeting corresponding to the plurality of topics, and forwarding current topic summaries corresponding to a current topic, among the plurality of topics, at the beginning of each of the plurality of time slots, to the confirmed user accounts.

Figure 4B:
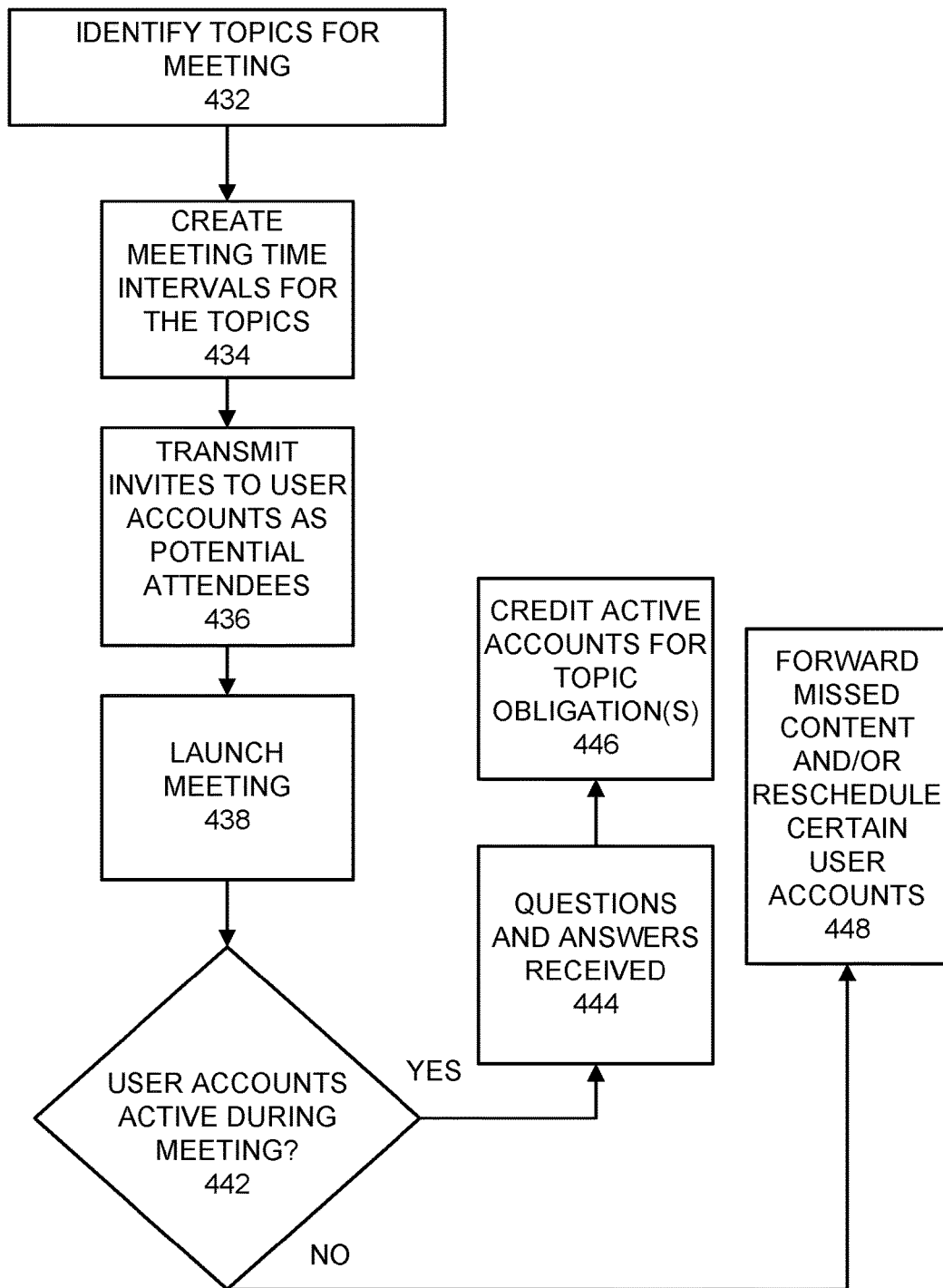
FIG. 4B illustrates an example flow diagram of an automated topic assignment and meeting interval management configuration according to example embodiments.

FIG. 4B illustrates an example flow diagram of an automated topic assignment and meeting interval management configuration according to example embodiments. Referring to FIG. 4B, the example method 430 may include a process where meetings are organized into intervals, each interval has a topic(s), attendees may receive credit for one or more sections based on a question and answer scenario, and, the topics have sub-topics and additional information which can be requested (e.g., software projects vs. software project #1, #2, etc.).

In this example, the method may provide identifying a plurality of topics to apply to a meeting having a defined time window 432, creating a plurality of meeting time intervals corresponding to the plurality of topics 434, transmitting meeting invites to user accounts identified as potential meeting attendees 436, launching the meeting 438, and identifying whether the user accounts were active in the meeting 442 so credit can be applied and recorded for participation and compliance, such as answering questions 444 at the end of a segment. The method may also include determining the user accounts which fulfilled a topic fulfillment obligation of one or more of the plurality of topics based on a user account presence during one or more of the plurality of meeting intervals so the credit can be offered 446. Also, specific segment content can be forwarded for a single segment to those that missed that segment to which they were assigned 448 and/or rescheduled for a future meeting.

The method may also include creating the plurality of meeting time intervals corresponding to the plurality of topics comprises assigning each of the plurality of meeting time intervals specific time lengths, and where a sum of the plurality of meeting time interval time lengths comprises the defined time window. The time lengths are dynamically assigned based on a context of one or more of the plurality of topics assigned to the plurality of meeting time intervals. The method may also include determining the user accounts have fulfilled a topic obligation by determining a length of time the user accounts were active during a corresponding meeting time interval, and where the topic fulfillment obligation includes one or more of receiving and storing correctly answered questions received from the user accounts during the corresponding time interval, and determining the user accounts which were active during the corresponding time interval for a minimum threshold percentage of a total time of the time interval, and storing a credit for the user accounts that have fulfilled the topic fulfillment obligation. The method may also include identifying one or more profiles having profile content which matches one or more of the plurality of topics, and where the one or more profiles are identified as matching the one or more of the plurality of topics when profile content of the profiles includes one or more identifiable skills which are related to the one or more of the plurality of topics. The one or more identifiable skills are determined to be related to the one or more of the plurality of topics when the one or more identifiable skills are identified as being within one or more categories associated with the plurality of topics.

Figure 4C:
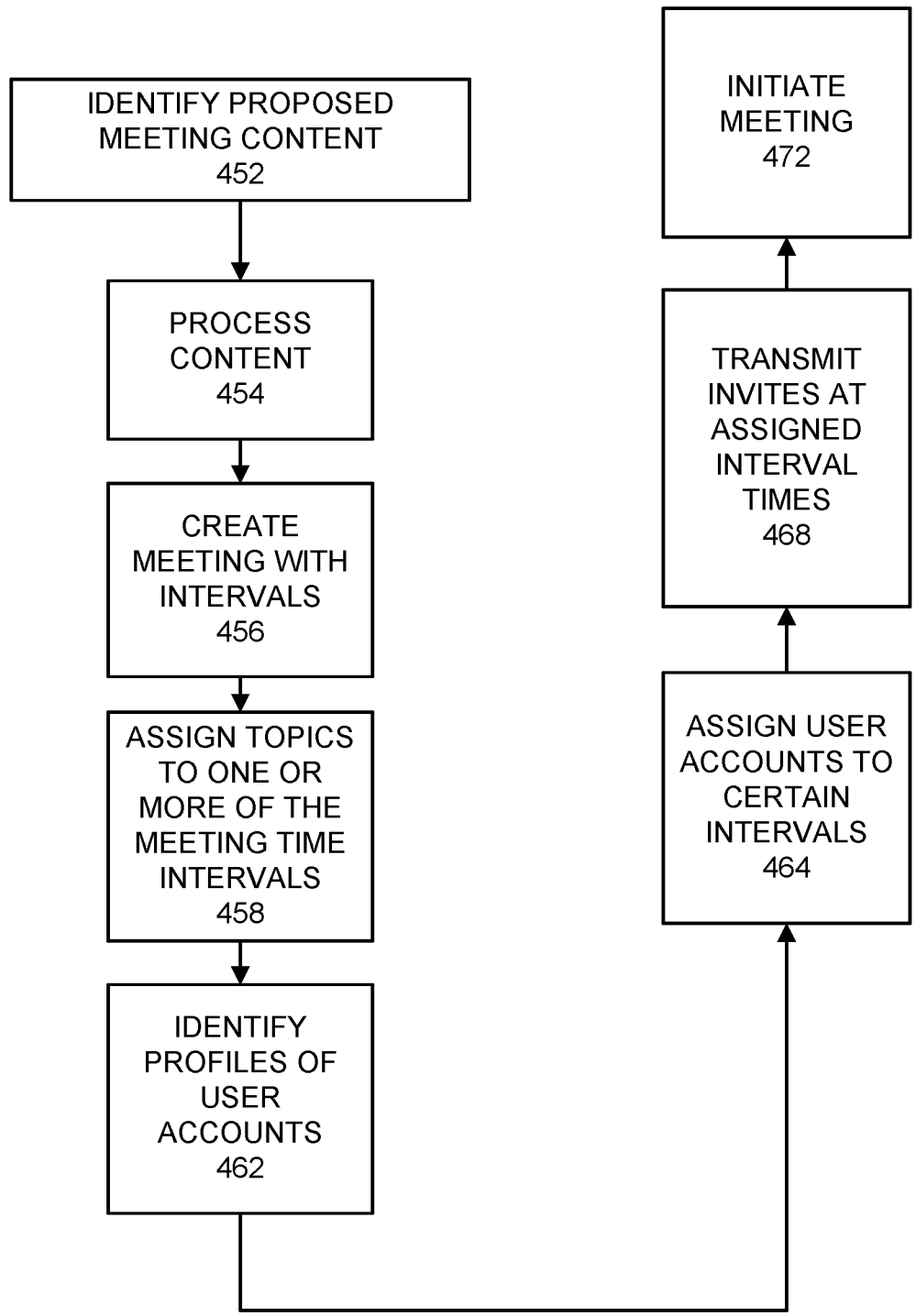
FIG. 4C illustrates an example flow diagram of an automated meeting interval assignment and management configuration according to example embodiments.

FIG. 4C illustrates an example flow diagram of an automated meeting interval assignment and management configuration according to example embodiments. Referring to FIG. 4C, the method 450 provides an example where a meeting's content is identified, processed, topics are created, intervals are created, profiles are identified, and then certain profiles which require association with certain intervals of the meeting are also assigned. The method includes identifying a proposed meeting summary 452 processing proposed meeting summary content of the proposed meeting summary to identify a plurality of topics to apply to a meeting 454, creating the meeting to include a plurality of meeting time intervals 456, assigning one or more of the plurality of topics to one or more of the plurality of meeting time intervals 458, identifying profiles of user accounts matching one or more of the plurality of topics 462, assigning the user accounts, with profiles matching one or more of the plurality of topics, to one or more of the meeting time intervals with assigned ones of the plurality of topics which match the profiles of the user accounts 464, transmitting meeting invites to the user accounts 468 and initiating the meeting at a scheduled time 472.

The method may also include parsing words and phrases from the proposed meeting summary content, responsive to the parsing of the words and phrases, determining a number of occurrences of related words and phrases, and creating the plurality of topics based on the number of occurrences of related words and phrases. The assigning of the user accounts, with profiles matching one or more of the plurality of topics, to one or more of the meeting time intervals with assigned ones of the plurality of topics which match the profiles of the user accounts further includes assigning each of the user accounts to at least one less than a total number of meeting time intervals. The method may also include parsing the profiles of the user accounts to identify keywords of interest, comparing the keywords of interest to the plurality of topics to generate confidence values based on a relevancy of the keywords of interest to the plurality of topics, and assigning the user profiles to those meeting time intervals having assigned topics which are above a threshold confidence level.

The method also includes determining during the meeting that a new meeting time interval, among the plurality of meeting time intervals, is going to begin within a threshold period of time, transmitting invites to user accounts which are assigned to the new meeting time interval, determining at the end of the new meeting time interval that the one or more user accounts which were sent the invite to participate in the new meeting time interval did not participate in the new meeting time interval, and after the meeting is completed, transmitting one or more of textual, audio and video information corresponding to only the new meeting time interval to the one or more user accounts which were sent the invite to participate in the new meeting time interval and did not participate in the new meeting time interval.

Figure 5:
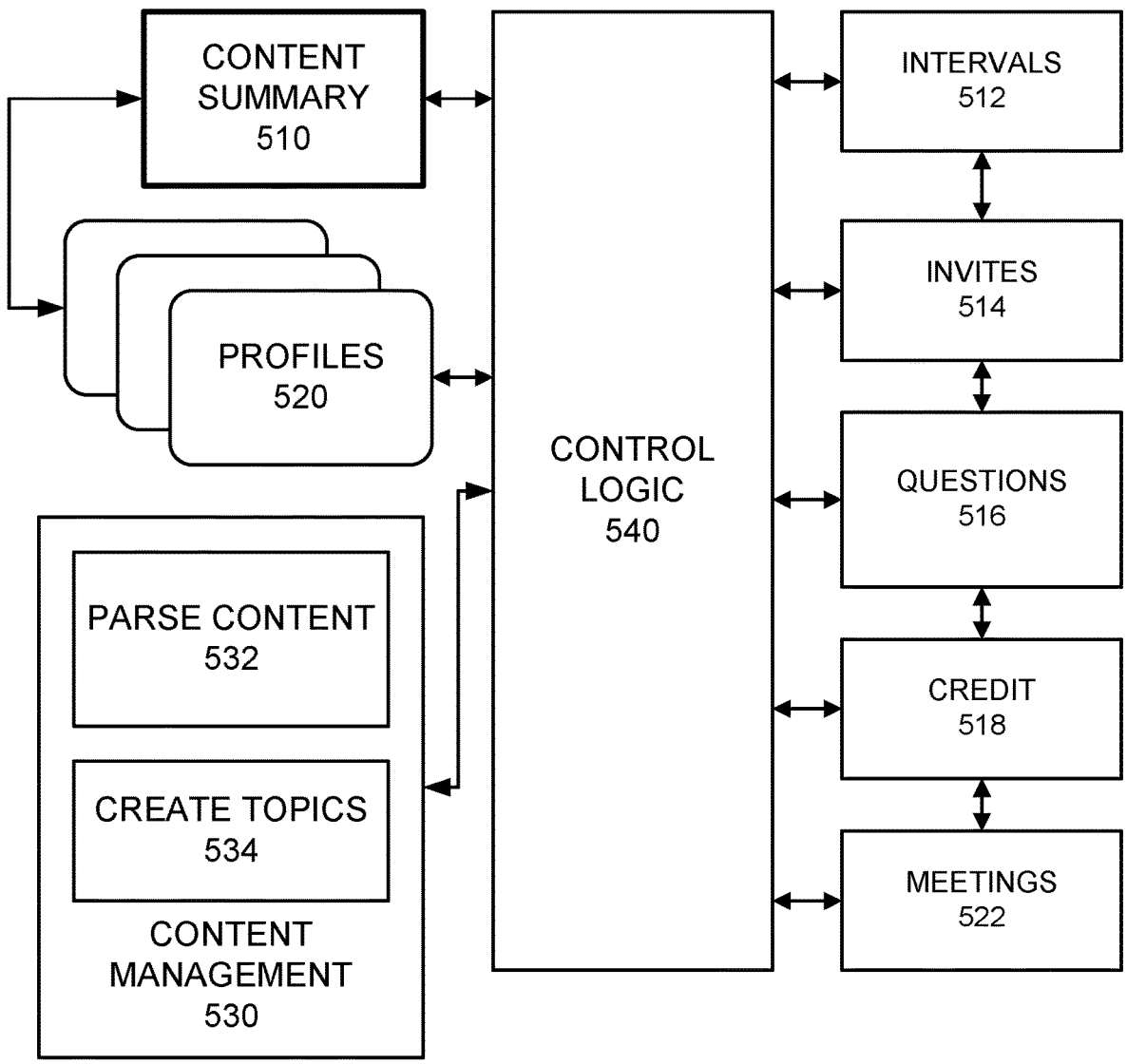
FIG. 5 illustrates an example logic control module configured to perform project parameter input and output management according to example embodiments.

FIG. 5 illustrates an example logic control module configured to perform meeting parameter input and output management according to example embodiments. Referring to FIG. 5, the example configuration 500 includes a control logic module 540 which is responsible for processing the input data, such as content summary information 510, profiles of potential meeting candidates 520 and content management parameters 530, such as parsed content 532 and created topics 534, including but not limited to deadlines 532, deliverables 534, etc. and providing certain outputs. The example outputs may include creating intervals of a meeting 512, invites to those which qualify for one or more intervals 514, questions 516 to identify when certain obligations were met, credit 518 to award those that fulfilled the requirements and meetings 522 scheduled based on all the input data. The output data can be used to predict the need for meetings and seek to optimize those meetings requiring accurate purpose and attendance.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
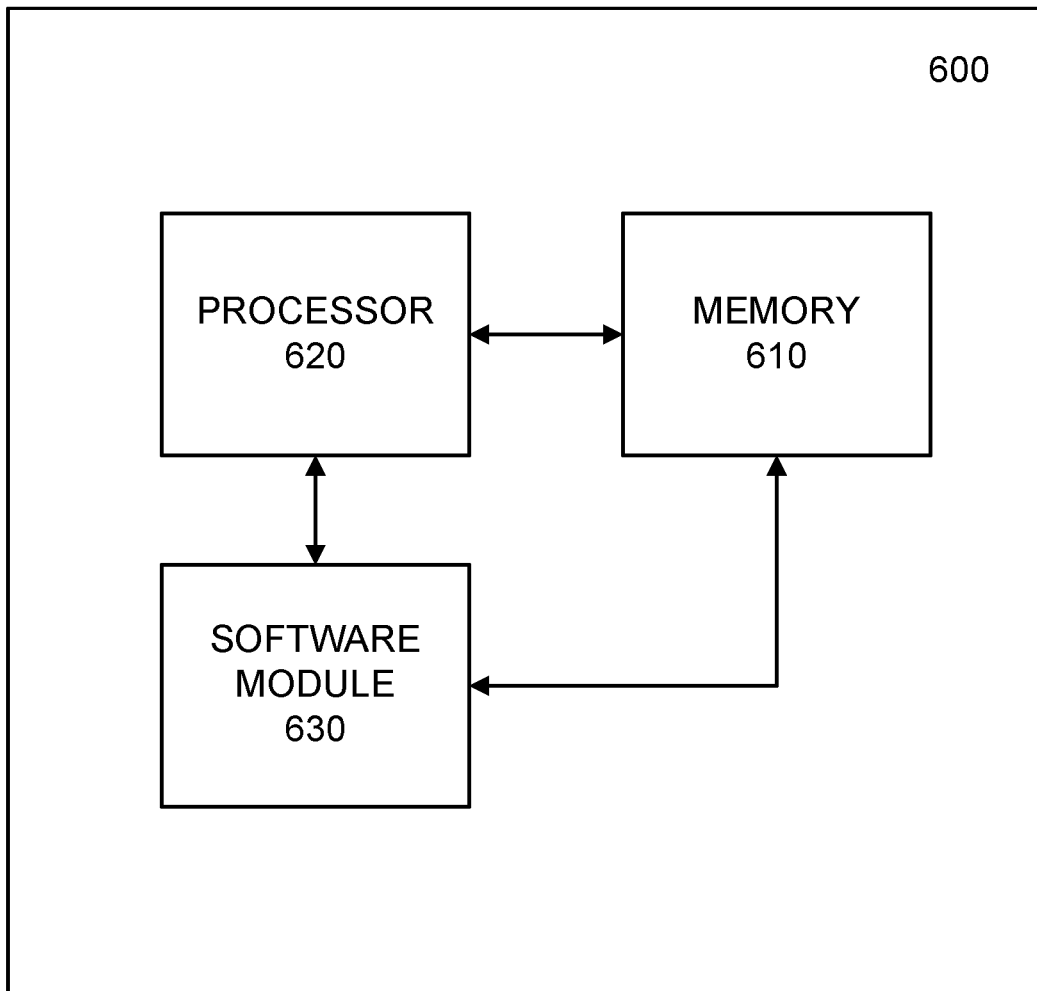
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving, via a server, content from an electronic media channel including one or more of an email, a text message, and a transcript of a telephone call;
determining, via a natural language processing (NLP) engine, one or more keywords associated with the meeting within the received content and generating an NLP summary associated with the meeting including the one or more keywords;
determining, via the server, to automatically schedule an online meeting based on the one or more keywords determined via the NLP engine;
identifying a plurality of topics for the online meeting based on an analysis of the content;
identifying attendees of the online meeting based on content included in NLP summaries recognized from user profiles of the identified attendees compared to the generated NLP summary associated with the meeting;
automatically transmitting, from the server, meeting invitations to user devices of the identified attendees;
initiating the online meeting at a scheduled time;
identifying whether each attendee has satisfied a topic obligation based on an amount of time that each attendee was active during a corresponding meeting time interval; and
predicting a need for a future meeting based on satisfaction of the topic obligations.

2. The method of claim 1, further comprising:
parsing words and phrases from the content;
responsive to the parsing of the words and phrases, determining a number of occurrences of related words and phrases; and
creating the plurality of topics based on the number of occurrences of related words and phrases.

3. The method of claim 1, further comprising:
parsing the user profiles to identify keywords of interest;
comparing the keywords of interest to the plurality of topics to generate confidence values based on a relevancy of the keywords of interest to the plurality of topics; and
assigning a user profile to the online meeting which has a confidence value above a threshold confidence level.

4. The method of claim 1, further comprising:
determining during the online meeting that a new online meeting is going to begin within a threshold period of time; and
transmitting meeting invitations to attendees that are assigned to the new online meeting.

5. The method of claim 4, further comprising:
determining at the end of the new online meeting that one or more attendees that were sent a meeting invitation to participate in the new online meeting did not participate in the new online meeting.

6. The method of claim 5, wherein after the online meeting is completed, the method further comprises:
transmitting one or more of textual, audio and video information corresponding to the new online meeting to user devices of the one or more attendees that did not participate in the new online meeting.

7. An apparatus comprising:
a processor configured to:
receive, via a server, content from an electronic media channel including one or more of an email, a text message, and a transcript of a telephone call;
determine, via a natural language processing (NLP) engine, one or more keywords associated with the meeting within the received content and generating an NLP summary associated with the meeting including the one or more keywords;
determine, via the server, to automatically schedule an online meeting based on the one or more keywords determined via the NLP engine;
identify a plurality of topics for the online meeting based on an analysis of the content,
identify attendees of the online meeting based on content included in NLP summaries recognized from user profiles of the identified attendees compared to the generated NLP summary associated with the meeting,
automatically transmit, from the server, meeting invitations to user devices of the identified attendees,
initiate the online meeting at a scheduled time,
identify whether each attendee has satisfied a topic obligation based on an amount of time that each attendee was active during a corresponding meeting time interval, and
predict a need for a future meeting based on satisfaction of the topic obligations.

8. The apparatus of claim 7, wherein the processor is further configured to:
parse words and phrases from the content;
responsive to the parses words and phrases, determine a number of occurrences of related words and phrases; and
create the plurality of topics based on the number of occurrences of related words and phrases.

9. The apparatus of claim 7, wherein the processor is further configured to:
parse the user profiles to identify keywords of interest;
compare the keywords of interest to the plurality of topics to generate confidence values based on a relevancy of the keywords of interest to the plurality of topics; and
assign a user profile to the online meeting which has a confidence value above a threshold confidence level.

10. The apparatus of claim 7, wherein the processor is further configured to:
determine during the online meeting that a new online meeting is going to begin within a threshold period of time;
transmit meeting invitations to attendees that are assigned to the new online meeting.

11. The apparatus of claim 10, wherein the processor is further configured to:
determine at the end of the new online meeting that one or more attendees that were sent a meeting invitation to participate in the new online meeting did not participate in the new online meeting.

12. The apparatus of claim 11, wherein after the online meeting is completed, the processor is further configured to:
transmit one or more of textual, audio and video information corresponding to the new online meeting to user devices of the one or more attendees that were sent the meeting invitation to participate in the new online meeting and did not participate in the new online meeting.

13. A non-transitory computer readable storage medium configured to store one or more instructions that when executed by a processor cause the processor to perform:
receiving, via a server, content from an electronic media channel including one or more of an email, a text message, and a transcript of a telephone call;
determining, via a natural language processing (NLP) engine, one or more keywords associated with the meeting within the received content and generating an NLP summary associated with the meeting including the one or more keywords;
determining, via the server, to automatically schedule an online meeting based on the one or more keywords determined via the NLP engine;
identifying a plurality of topics for the online meeting based on an analysis of the content;
identifying attendees of the online meeting based on content included in NLP summaries recognized from user profiles of the identified attendees compared to the generated NLP summary associated with the meeting;
automatically transmitting, from the server, meeting invitations to user devices of the identified attendees;
initiating the online meeting at a scheduled time; and
identifying whether each attendee has satisfied a topic obligation based on an amount of time that each attendee was active during a corresponding specific time interval.

14. The non-transitory computer readable storage medium of claim 13, wherein the one or more instructions further cause the processor to perform:
parsing words and phrases from the content;
responsive to the parsing of the words and phrases, determining a number of occurrences of related words and phrases; and
creating the plurality of topics based on the number of occurrences of related words and phrases.

15. The non-transitory computer readable storage medium of claim 13, wherein the one or more instructions further cause the processor to perform:
parsing the user profiles to identify keywords of interest;
comparing the keywords of interest to the plurality of topics to generate confidence values based on a relevancy of the keywords of interest to the plurality of topics; and
assigning user profiles to the online meeting which have a confidence value above a threshold confidence level.

16. The non-transitory computer readable storage medium of claim 13, wherein the one or more instructions further cause the processor to perform:
determining during the meeting that a new online meeting is going to begin within a threshold period of time; and
transmitting meeting invitations to attendees that are assigned to the new online meeting.

17. The non-transitory computer readable storage medium of claim 16, wherein the one or more instructions further cause the processor to perform:
determining at the end of the new online meeting that one or more attendees that were sent a meeting invitation to participate in the new online meeting did not participate in the new online meeting, and
transmitting one or more of textual, audio and video information corresponding to the new online meeting to user devices of the one or more attendees that were sent the meeting invitation to participate in the new online meeting and did not participate in the new online meeting.

* * * * *